(12) United States Patent
Lindbo et al.

(10) Patent No.: US 11,261,025 B2
(45) Date of Patent: Mar. 1, 2022

(54) ROBOTIC OBJECT HANDLING SYSTEM, DEVICE AND METHOD

(71) Applicant: Ocado Innovation Limited, Hatfield (GB)

(72) Inventors: Sverker Lindbo, Hatfield (GB); Andrew John Ingram-Tedd, Hatfield (GB)

(73) Assignee: OCADO INNOVATION LIMITED, Hatfield (GB)

( * ) Notice: Subject to any disclaimer, the term of this patent is extended or adjusted under 35 U.S.C. 154(b) by 0 days.

(21) Appl. No.: 15/322,408

(22) PCT Filed: Jun. 24, 2015

(86) PCT No.: PCT/EP2015/064283
§ 371 (c)(1),
(2) Date: Dec. 27, 2016

(87) PCT Pub. No.: WO2015/197709
PCT Pub. Date: Dec. 30, 2015

(65) Prior Publication Data
US 2017/0129703 A1    May 11, 2017

(30) Foreign Application Priority Data

Jun. 25, 2014   (GB) ........................................ 1411254
Apr. 15, 2015   (GB) ........................................ 1506364

(51) Int. Cl.
*B65G 1/04*       (2006.01)
*G06Q 10/08*    (2012.01)
*G06Q 10/06*    (2012.01)

(52) U.S. Cl.
CPC .......... *B65G 1/0464* (2013.01); *B65G 1/0492* (2013.01); *G06Q 10/06315* (2013.01); *G06Q 10/08* (2013.01); *G06Q 10/083* (2013.01)

(58) Field of Classification Search
CPC ...................................................... B65G 1/0464
See application file for complete search history.

(56) References Cited

U.S. PATENT DOCUMENTS 2,701,065 A      2/1955 Bertel
3,964,619 A  *  6/1976 Irmler ..................... B65G 1/08
                                                             414/281

(Continued)

FOREIGN PATENT DOCUMENTS

CN          1106356 A       8/1995
CN        101553398 A     10/2009

(Continued)

OTHER PUBLICATIONS

International Search Report (PCT/ISA/210) dated Oct. 19, 2015, by the European Patent Office as the International Searching Authority for International Application No. PCT/EP2015/064283.

(Continued)

*Primary Examiner* — James Keenan
(74) *Attorney, Agent, or Firm* — Buchanan Ingersoll & Rooney PC

(57) ABSTRACT

A robotic object handling system and robotic load handling device for operation thereon is disclosed. The object handling system includes a number of robotic load handling devices operational on a grid-like structure, the structure having sets of parallel tracks, disposed above a hive of stacked bins. The bins contain inventory items to be picked by the system. Load handling devices capable of carrying multiple bins of a single grid-spacing size or single bins of a multiple grid spacings are operational on the grid and retrieve and transport bins under the control of a computerised order picking utility.

14 Claims, 14 Drawing Sheets

(56) References Cited

U.S. PATENT DOCUMENTS

| | | | |
|---|---|---|---|
| 5,615,992 | A | 4/1997 | Proske et al. |
| 6,315,513 | B1 * | 11/2001 | Harukawa ............... B65G 61/00 414/281 |
| 6,654,662 | B1 | 11/2003 | Hognaland |
| 7,329,081 | B2 * | 2/2008 | Baker ...................... B65G 1/04 414/268 |
| 7,850,412 | B2 | 12/2010 | Benedict et al. |
| 8,075,238 | B2 * | 12/2011 | Wirz .................... B65G 1/0407 414/281 |
| 8,554,643 | B2 * | 10/2013 | Kortelainen ......... B65G 1/0435 414/277 |
| 9,272,845 | B2 * | 3/2016 | Honkanen ............ B65G 1/0421 |
| 9,682,822 | B2 * | 6/2017 | Lindbo .................. B65G 1/137 |
| 2008/0075568 | A1 | 3/2008 | Benedict et al. |
| 2010/0247275 | A1 | 9/2010 | Karlen et al. |
| 2014/0133943 | A1 | 5/2014 | Razumov |
| 2015/0291357 | A1 * | 10/2015 | Razumov ............. B65G 1/1373 414/279 |

FOREIGN PATENT DOCUMENTS

| | | | | |
|---|---|---|---|---|
| DE | 19935742 | A1 * | 2/2001 | ........... B65G 1/0464 |
| EP | 0 767 113 | B | 4/1997 | |
| GB | 2211822 | A * | 7/1989 | ........... B65G 1/0464 |
| GB | 2517264 | A | 2/2015 | |
| GB | 2518259 | A | 3/2015 | |
| GB | 2520104 | A | 5/2015 | |
| JP | 2001-522342 | A | 11/2001 | |
| NO | 993282 | L | 10/2004 | |
| WO | 2013167907 | A1 | 11/2013 | |
| WO | WO-2013167907 | A1 * | 11/2013 | ........... B65G 1/0464 |
| WO | WO 2014/090684 | A1 | 6/2014 | |
| WO | 2015019055 | A1 | 2/2015 | |

OTHER PUBLICATIONS

Written Opinion (PCT/ISA/237) dated Oct. 19, 2015, by the European Patent Office as the International Searching Authority for International Application No. PCT/EP2015/064283.

International Preliminary Report on Patentability and Written Opinion dated Dec. 27, 2016 in corresponding International Patent Application No. PCT/EP2015/064283.

Office Action (Examination Report No. 1) dated Jan. 15, 2020, by the Australian Patent Office in corresponding Australian Patent Application No. 2015279251. (5 pages).

First Office Action dated Mar. 31, 2020, by the Chinese Patent Office in corresponding Chinese Patent Application No. 201580044136. 5, and an English Translation of the Office Action. (25 pages).

Office Action (Examination) dated Feb. 7, 2019, by the European Patent Office in corresponding European Patent Application No. 15738285.4. (6 pages).

Office Action (Examination Report) dated Nov. 18, 2015, by the Great Britain Patent Office in corresponding Great Britain Patent Application No. 1511137. (6 pages).

First Office Action dated Mar. 26, 2019, by the Japanese Patent Office in corresponding Japanese Patent Application No. 2016-575364, English Translation only. (2 pages).

English Translation First Office Action dated Jan. 12, 2021, by the Japanese Patent Office in corresponding Japanese Patent Application No. 2020-037420. (4 pages).

Office Action (Notification of Reason for Refusal) dated May 21, 2021, by the Korean Patent Office in corresponding Korean Patent Application No. 10-2017-7002400, and an English Translation of the Office Action. (10 pages).

Office Action dated Aug. 11, 2021 in corresponding Canadian Patent Application No. 2,953,023, 5 pages.

Office Action dated Aug. 24, 2021 in corresponding Japanese Patent Application No. 2020-03742 with English translation, 6 pages.

* cited by examiner

ROBOTIC OBJECT HANDLING SYSTEM, DEVICE AND METHOD

FIELD

The present invention relates to a robotic object handling system, device and method. More specifically but not exclusively, it relates to a range of robotic devices for use in a robotic object handling system and a method extending the variety of items which may be handled in such a system.

RELATED APPLICATIONS

This application claims priority from UK Patent Application No GB 1506364.7 filed on 15 Apr. 2015 and UK Patent Application No GB1411254.4 filed on 25 Jun. 2014. The content of both these patent applications is hereby incorporated by reference.

BACKGROUND

Some commercial and industrial activities require systems that enable the storage and retrieval of a large number of different products. One known type of system for the storage and retrieval of items in multiple product lines involves arranging storage bins or containers in stacks on top of one another, the stacks being arranged in rows. The storage bins or containers are accessed from above, removing the need for aisles between the rows and allowing more containers to be stored in a given space.

Methods of handling containers stacked in rows are well known. In some such systems, for example as described in U.S. Pat. No. 2,701,065 Bertel, comprise free-standing stacks of containers arranged in rows in order to reduce the storage volume associated with storing such containers but yet still providing access to a specific container if required. Access to a given container is made possible by providing relatively complicated hoisting mechanisms which can be used to stack and remove given containers from stacks. The cost of such systems are, however, impractical in many situations and they have mainly been commercialised for the storage and handling of large shipping containers.

The concept of using freestanding stacks of containers and providing a mechanism to retrieve and store specific containers has been developed further, for example as described in EP 0 767 113 B to Cimcorp. This document discloses a mechanism for removing a plurality of stacked containers, using a robotic load handler in the form of a rectangular tube which is lowered around the stack of containers, and which is configured to be able to grip a container at any level in the stack. In this way, several containers can be lifted at once from a stack. The moveable tube can be used to move several containers from the top of one stack to the top of another stack, or to move containers from a stack to an external location and vice versa. Such systems can be particularly useful where all of the containers in a single stack contain the same product (known as a single-product stack).

In the system described in '113, the height of the tube has to be as least as high as the height of the largest stack of containers, so that that the highest stack of containers can be extracted in a single operation. Accordingly, when used in an enclosed space such as a warehouse, the maximum height of the stacks is restricted by the need to accommodate the tube of the load handler.

EP 1037828 B1 (Autostore) the contents of which are incorporated herein by reference, describes a system in which stacks of containers are arranged within a frame structure. A system of this type is illustrated schematically in FIGS. 1 to 4 of the accompanying drawings. Robotic load handling devices can be controllably moved around the stack on a system of tracks on the upper most surface of the stack.

One form of robotic load handling device is further described in Norwegian patent number 317366, the contents of which are incorporated herein by reference. FIGS. 3(a) and 3(b) are schematic perspective views of a load handling device from the rear and front, respectively, and FIG. 3(c) is a schematic front perspective view of a load handling device lifting a bin.

A further development of load handling device is described in UK Patent Application No GB1413155.1 filed 24 Jul. 2014 incorporated herein by reference, where each robotic load handler only covers one grid space, thus allowing higher density of load handlers and thus higher throughput of a given size system.

One significant drawback of the prior art systems are that they can only use containers of one specified footprint. In addition, the height of the containers 114 (FIGS. 3b and 3c) is often constrained by the design of the robotic load handlers. This typically constrains the use of such systems to such items which fit inside the containers. In typical applications, this means that 1-10% of the total volumes in the business needs a different handling method, typically manual. This means added complexity in the system, low productivity and inefficient use of space. The present invention addresses these issues by providing a way of integrating a solution for small volumes of larger products within a system primarily designed for large volumes of smaller items.

In a typical retail or parcel handling situation, the system described above can handle most, but not all of the products or parcels. For most products, it is ideal to use a standard container of approximately 600×400×350 mm (l×w×h), since a container of that size typically holds 90-99% of all products and yet is small enough to be handled manually when the need arises. That size container is also small enough to offer a very large number of containers in a given size building and therefore facilitates the handling of a very large multitude of different products. In some instances of prior art systems it is also possible to use a mixture of the normal height container and lower containers. The purpose of this is to increase the number of containers in a given size system, which can be advantageous under certain conditions.

SUMMARY

According to the invention there is provided an object handling system comprising two substantially perpendicular sets of rails forming a grid above a plurality of stacked containers, a portion of the stack comprising bins of a larger cross sectional area than the containers in the remainder of the stack, the handling system further comprising a plurality of robotic load handling devices operating on the grid above the stacked containers, the load handling devices comprising a body mounted on wheels, a first set of wheels being arranged to engage with at least two rails of the first set of rails, the second set of wheels being arranged to engage with at least two rails of the second set of rails, the first set of wheels being independently moveable and driveable with respect to the second set of wheels such that when in motion only one set of wheels is engaged with the grid at any one time thereby enabling movement of the load handling device along the rails to any point on the grid by driving only the set of wheels engaged with the rails, at least one robotic handling device operable on the grid being sized so as to lift and move containers from within the portion of the stack comprising large containers.

According to the invention there is further provided a robotic load handling device comprising a body having a cavity, the body comprising two sets of wheels mounted on perpendicular sides of the body, each set of wheels being independently retractable and driveable with respect to the other set of wheels, the cavity in the body being sized so as to accept containers from an object picking system, the object handling system comprising a grid disposed above a plurality of stacks of containers, the cavity in the body being sized to accept containers of a cross sectional area defined by an integer number of grid spacings in the object handling system.

In this way, the height of a container is no longer constrained by the dimensions of the robotic load handler. With taller containers, for instance 600×400×800 mm, it would be possible to handle many of the items which would not fit in the normal container.

DESCRIPTION OF THE DRAWING FIGURES

The invention will now be described with reference to the accompanying diagrammatic drawings in which FIG. 1 is a schematic perspective view of a frame structure for housing a plurality of stacks of bins in a known storage system.

FIG. 2 is a schematic plan view of part of the frame structure of FIG. 1.

FIGS. 3(*a*) and 3(*b*) are schematic perspective views, from the rear and front respectively, of one form of robotic load handling device for use with the frame structure of FIGS. 1 and 2, and FIG. 3(*c*) is a schematic perspective view of the known load handler device in use lifting a bin.

Figure 6:
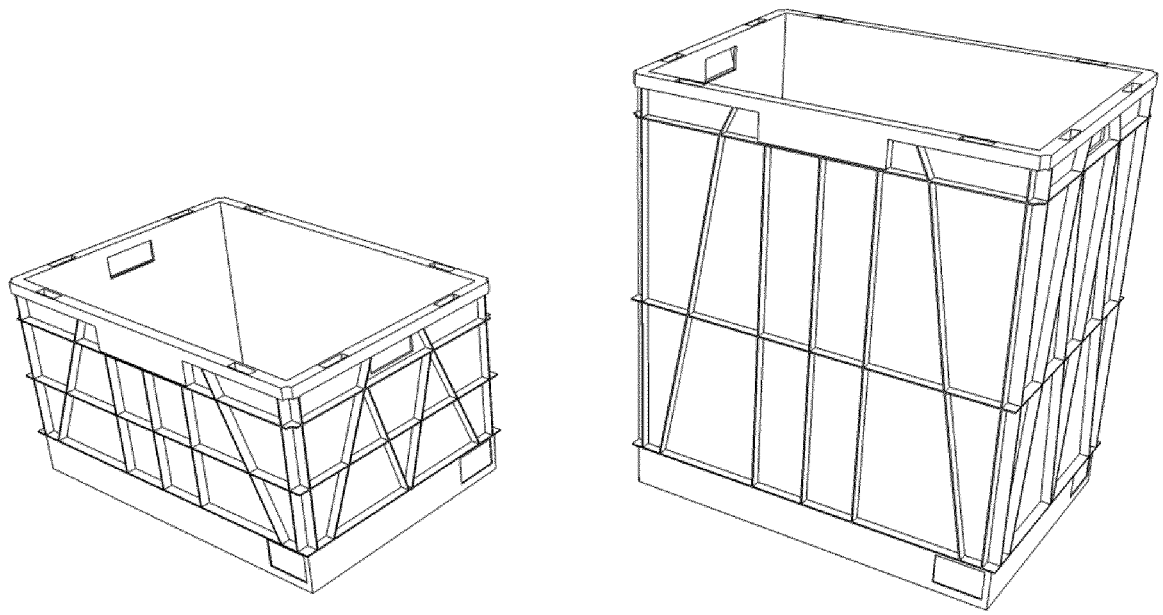

The left side of FIG. 6 is a schematic perspective representation of a normal bin, and the right side of FIG. 6 is a schematic perspective representation of a taller bin of different dimensions capable of carrying goods of larger sizes for movement by a load handler of one form of the invention.

Figure 7:
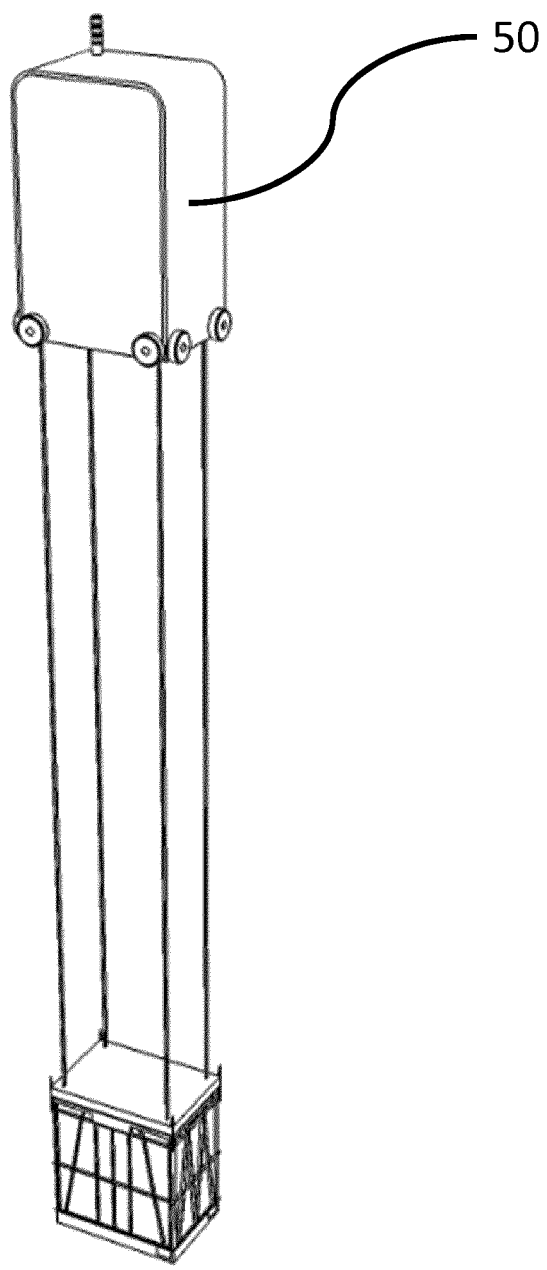

FIG. 7 is a schematic representation of a load handling device in accordance with one form of the invention capable of transporting a bin as shown in the right side of FIG. 6.

Figure 8:
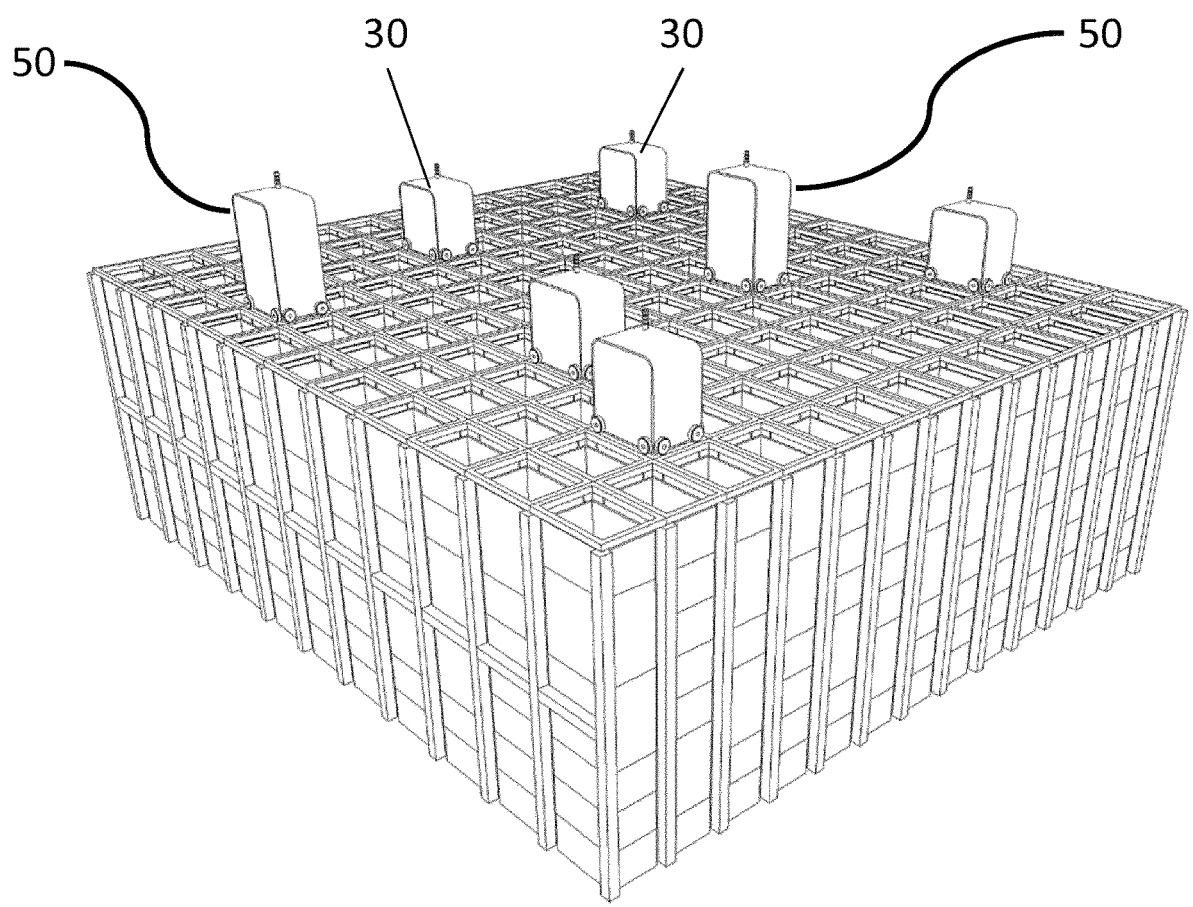

FIG. 8 is a schematic representation of a mixture of load handling devices as shown in FIG. 7 operational on a grid with load handling devices of a normal size, the stack containing bins of normal and tall dimensions.

Figure 1:
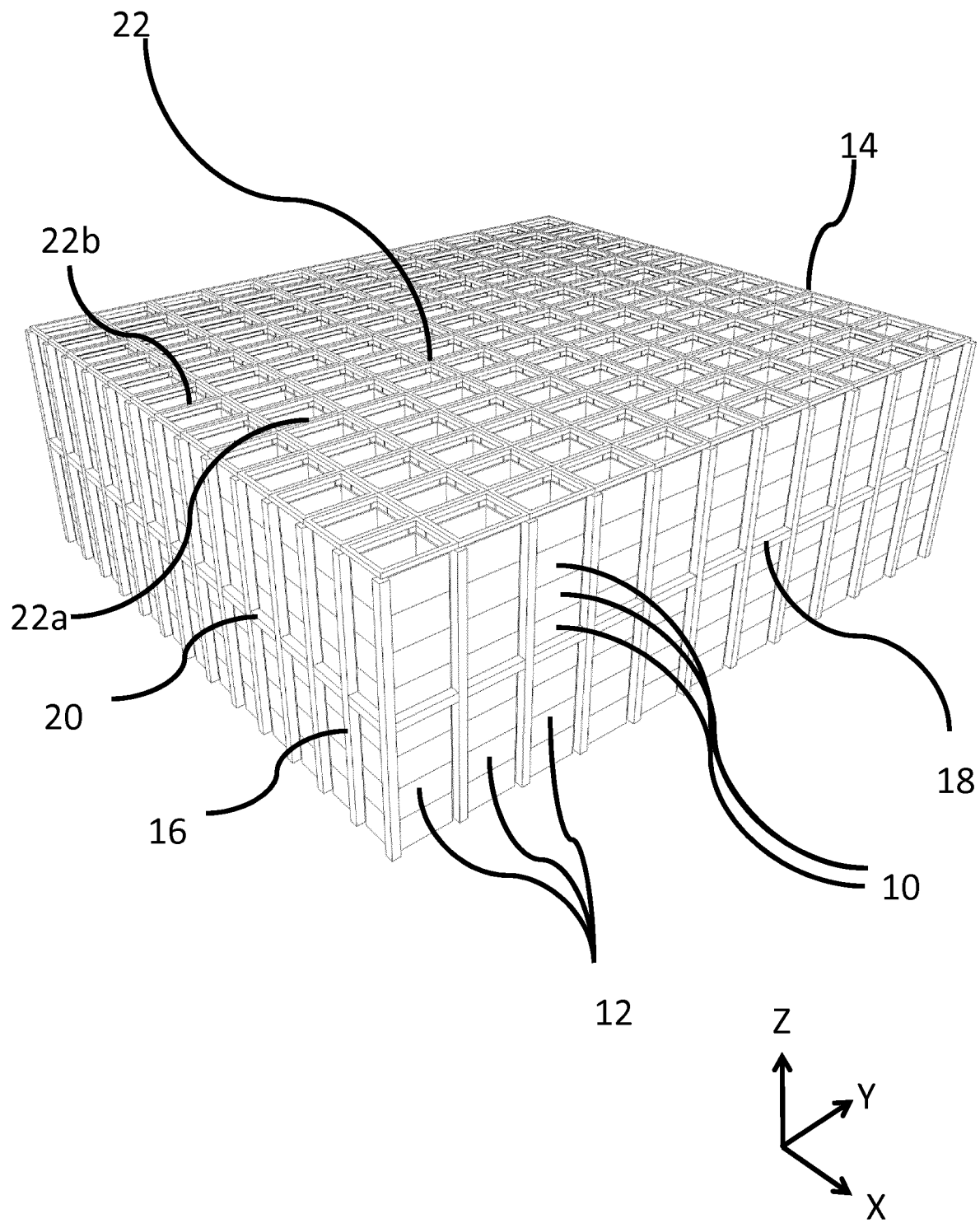
Figure 2:
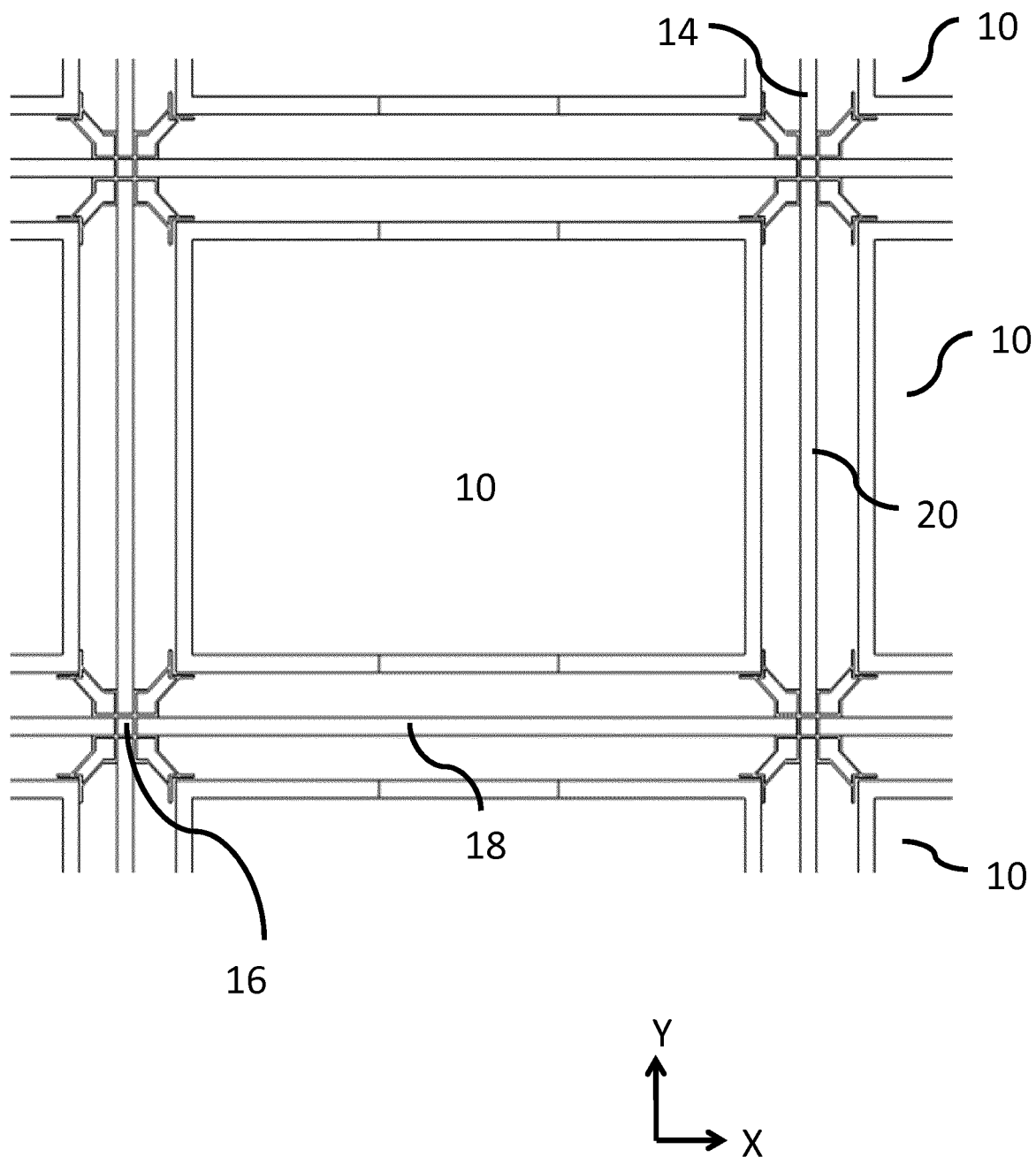
Figure 9:
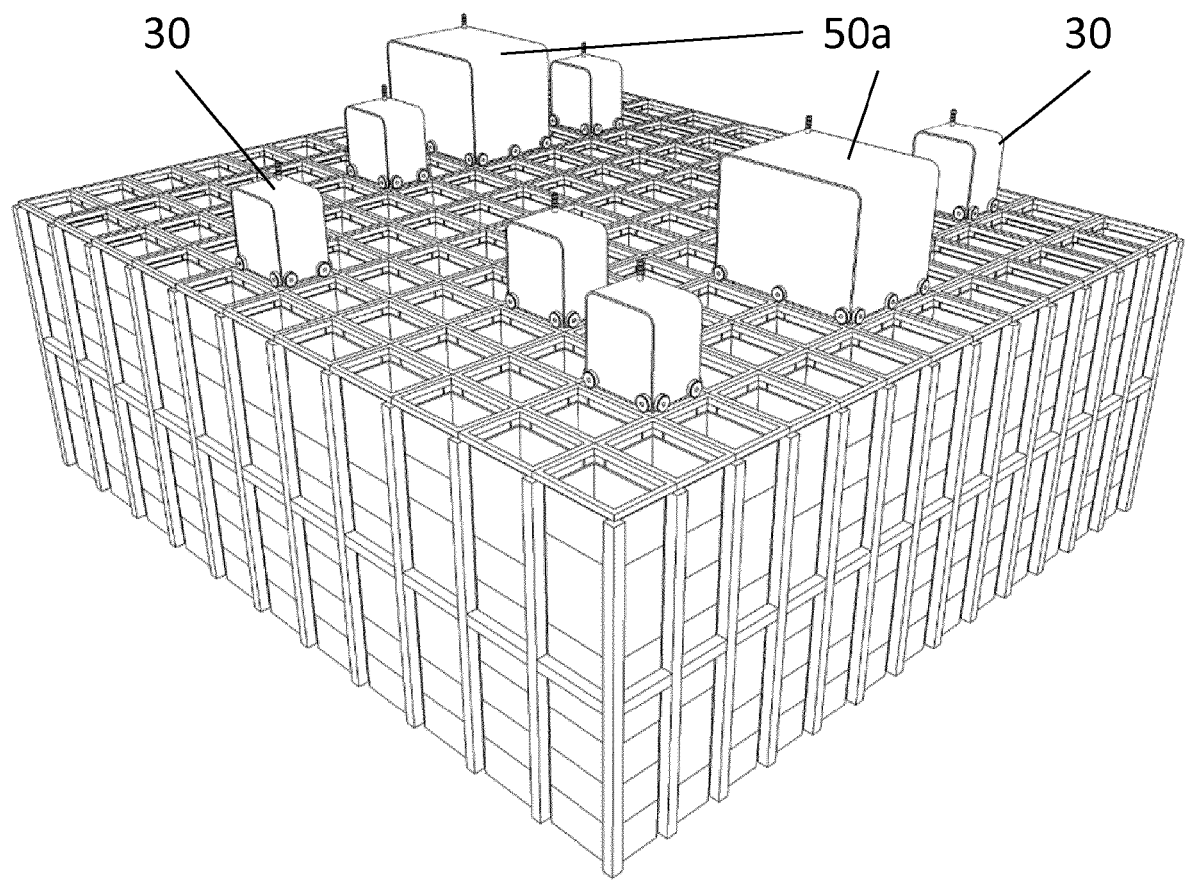

FIG. 9 is a schematic representation of a load handling device of a second form of the invention in operation on a grid as shown in FIGS. 1 and 2, the second form of load handling device being larger in all dimensions than a normal load handling device (also shown for comparison).

Figure 10:
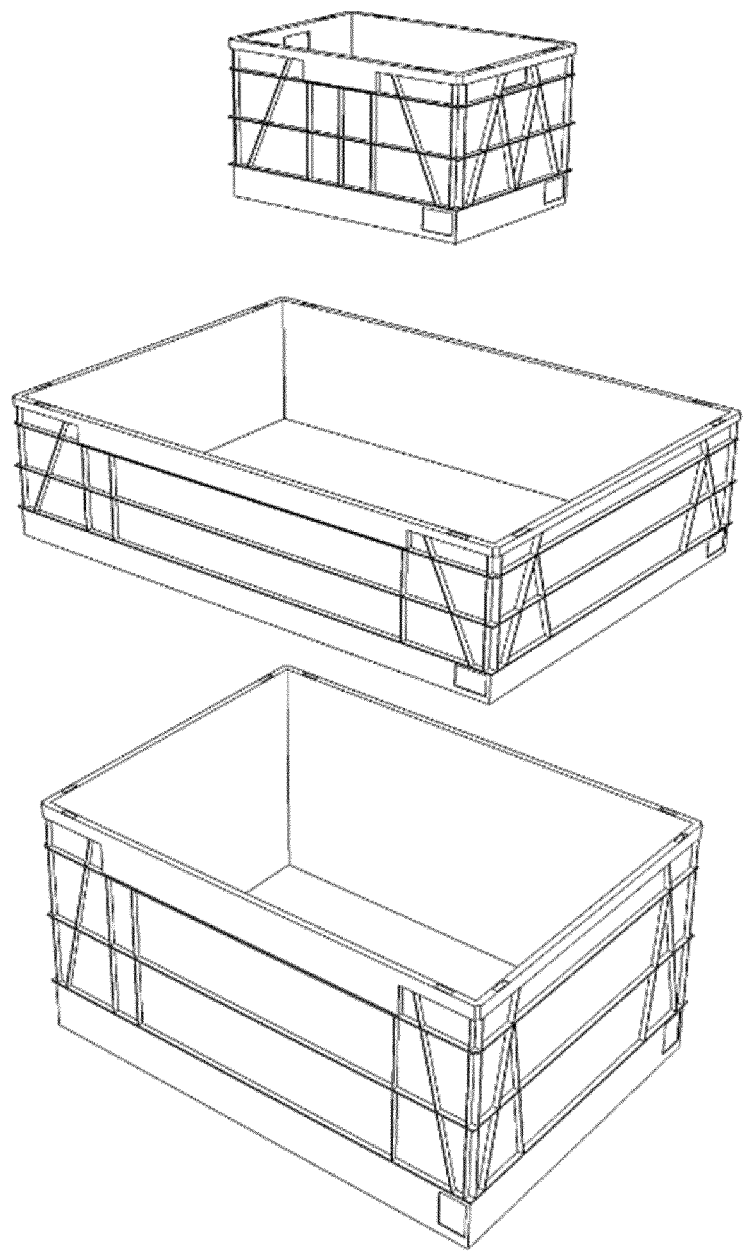

FIG. 10 is a schematic representation of a selection of large containers of different dimensions to a normal bin that it would be possible to store in the stack for retrieval by a load handling device in accordance with further forms of the invention.

Figure 11:
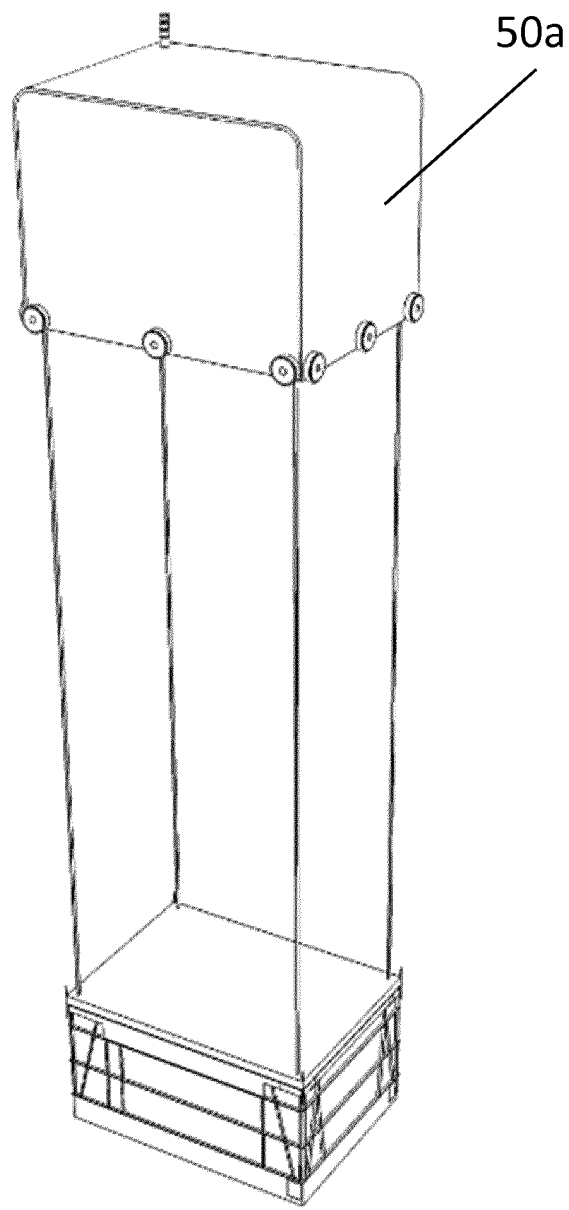

FIG. 11 is a schematic representation of a large load handling device lifting a large container in accordance with a third embodiment of the invention.

Figure 12:
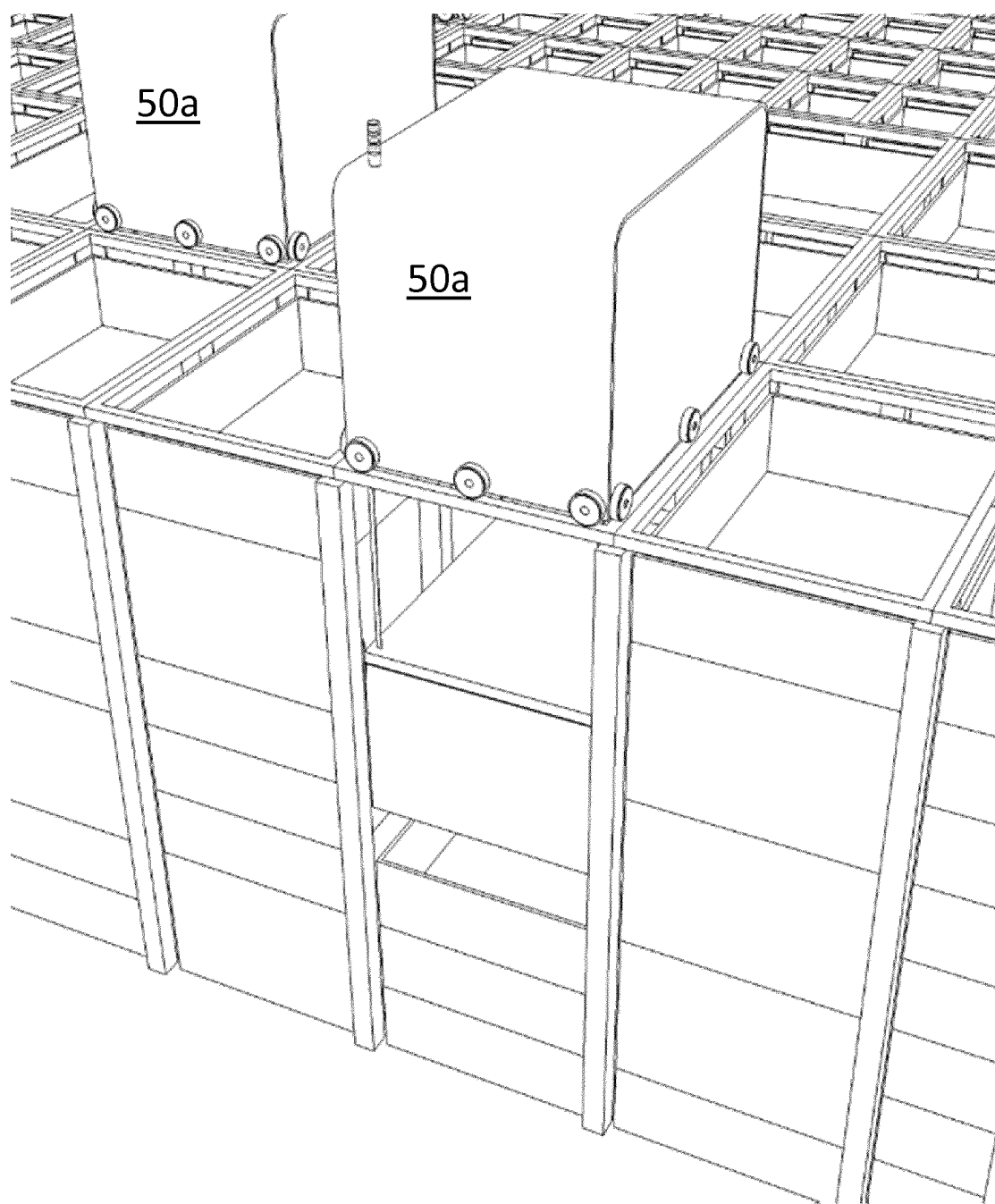

FIG. 12 is a schematic representation of a large load handling device in accordance with one form of the invention lifting a large bin from a stack of large bins of different heights.

Figure 13:
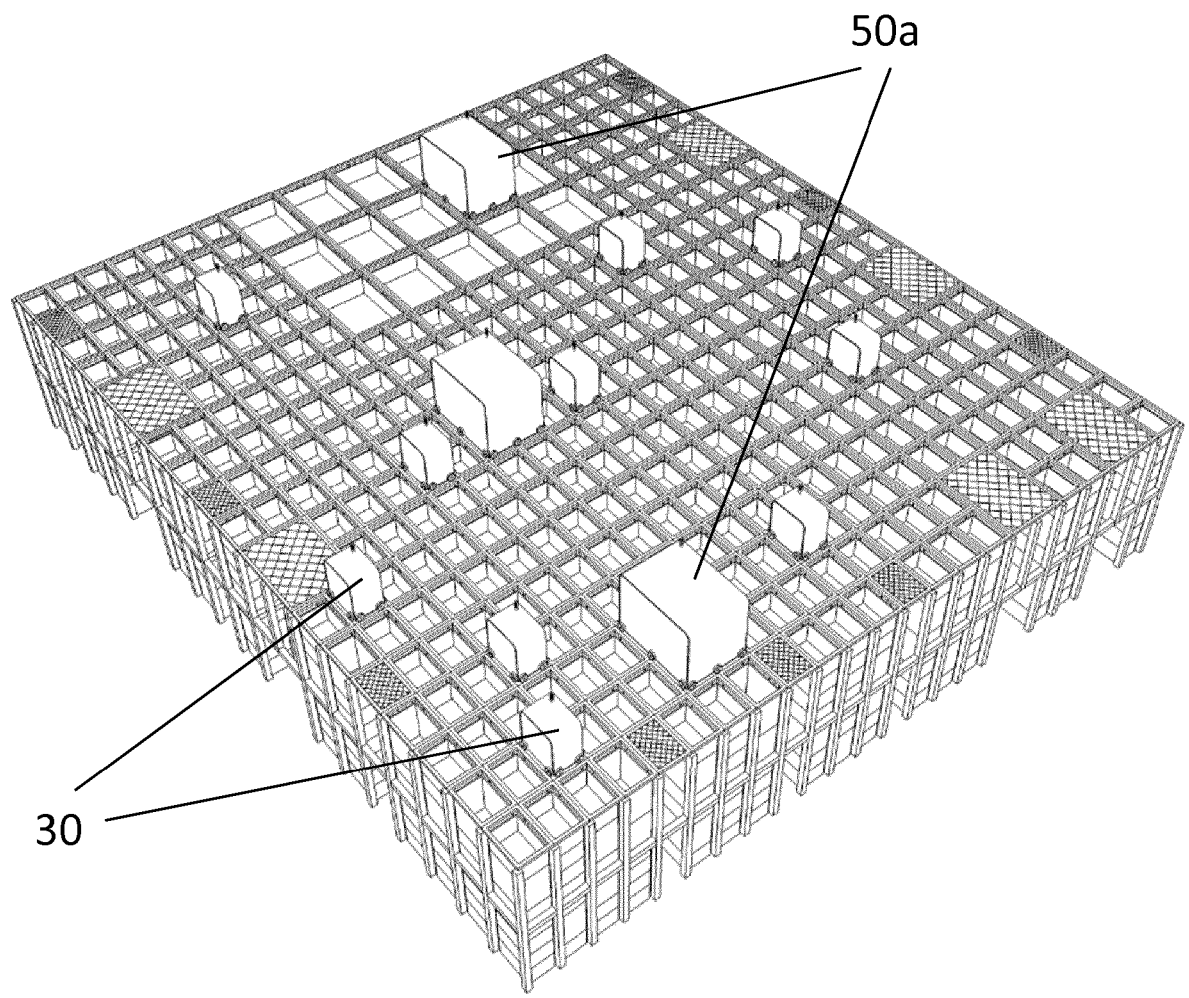

FIG. 13 is a schematic representation of a grid system with areas for large bins and some stations for large bins, along with areas and stations containing only normal sized bins and load handling devices.

DETAILED DESCRIPTION

As shown in FIGS. 1 and 2, stackable containers, known as bins 10, are stacked on top of one another to form stacks 12. The stacks 12 are arranged in a grid frame structure 14 in a warehousing or manufacturing environment. FIG. 1 is a schematic perspective view of the frame structure 14, and FIG. 2 is a top-down view showing a single stack 12 of bins 10 arranged within the frame structure 14. Each bin 10 typically holds a plurality of product items (not shown), and the product items within a bin 10 may be identical, or may be of different product types depending on the application.

The frame structure 14 comprises a plurality of upright members 16 that support horizontal members 18, 20. A first set of parallel horizontal members 18 is arranged perpendicularly to a second set of parallel horizontal members 20 to form a plurality of horizontal grid structures supported by the upright members 16. The members 16, 18, 20 are typically manufactured from metal. The bins 10 are stacked between the members 16, 18, 20 of the frame structure 14, so that the frame structure 14 guards against horizontal movement of the stacks 12 of bins 10, and guides vertical movement of the bins 10.

Figure 3A:
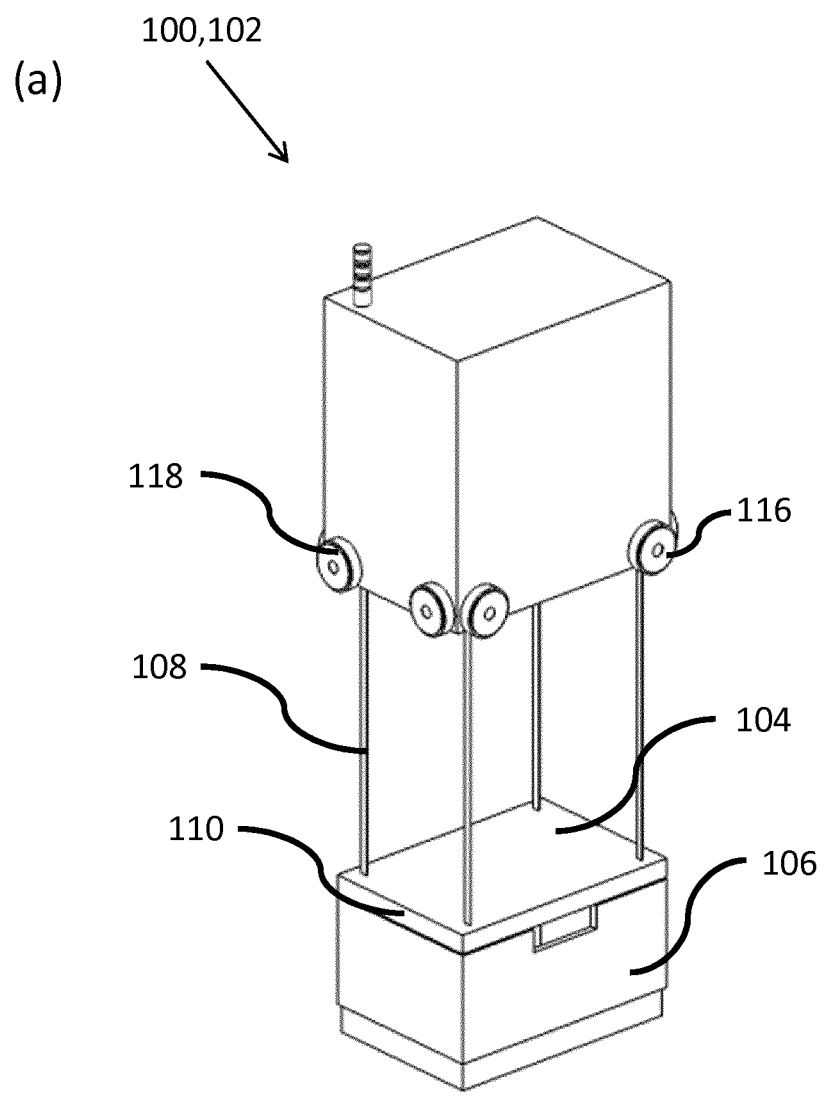
Figures 3B, 3C:
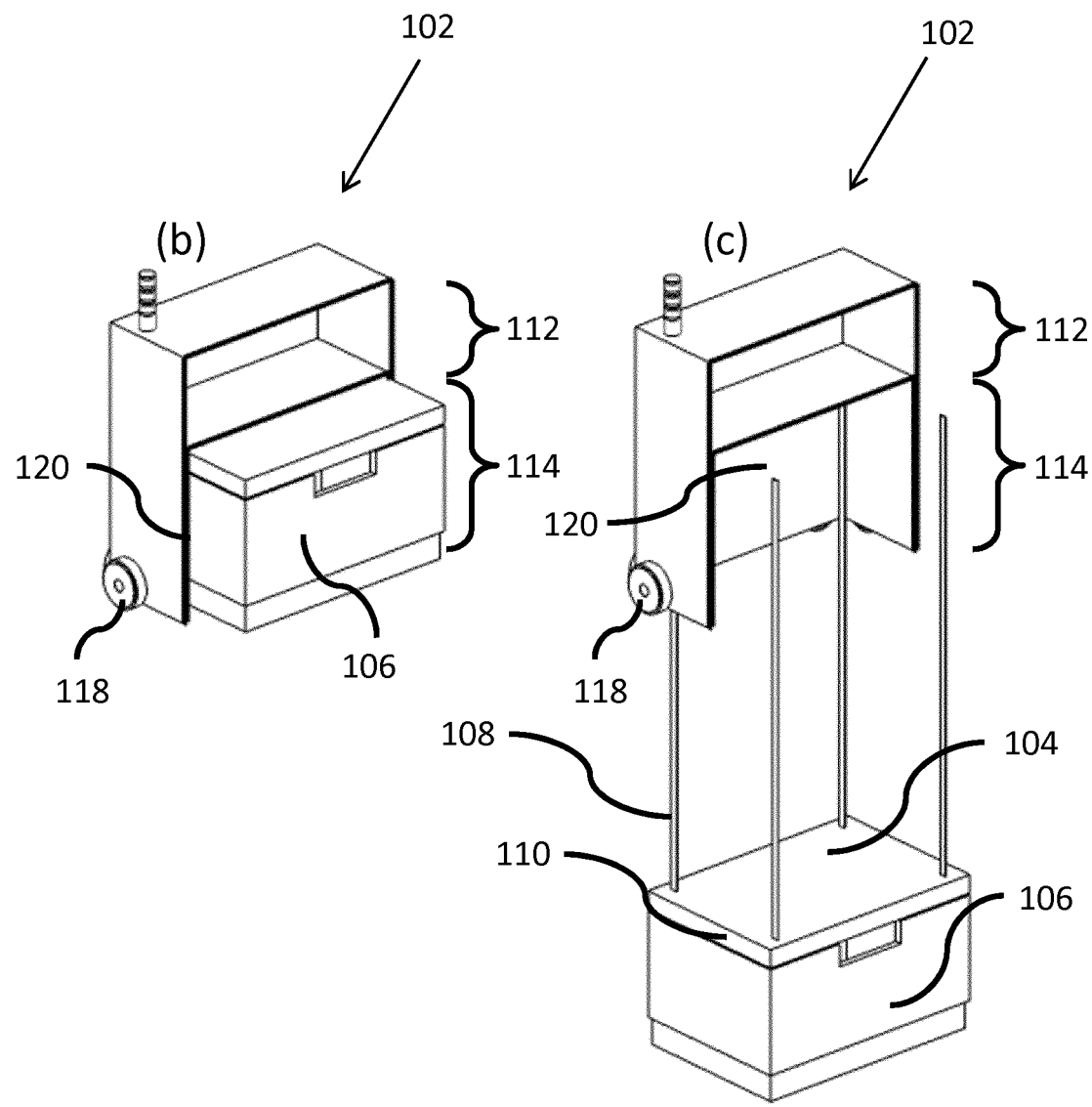
Figure 4:
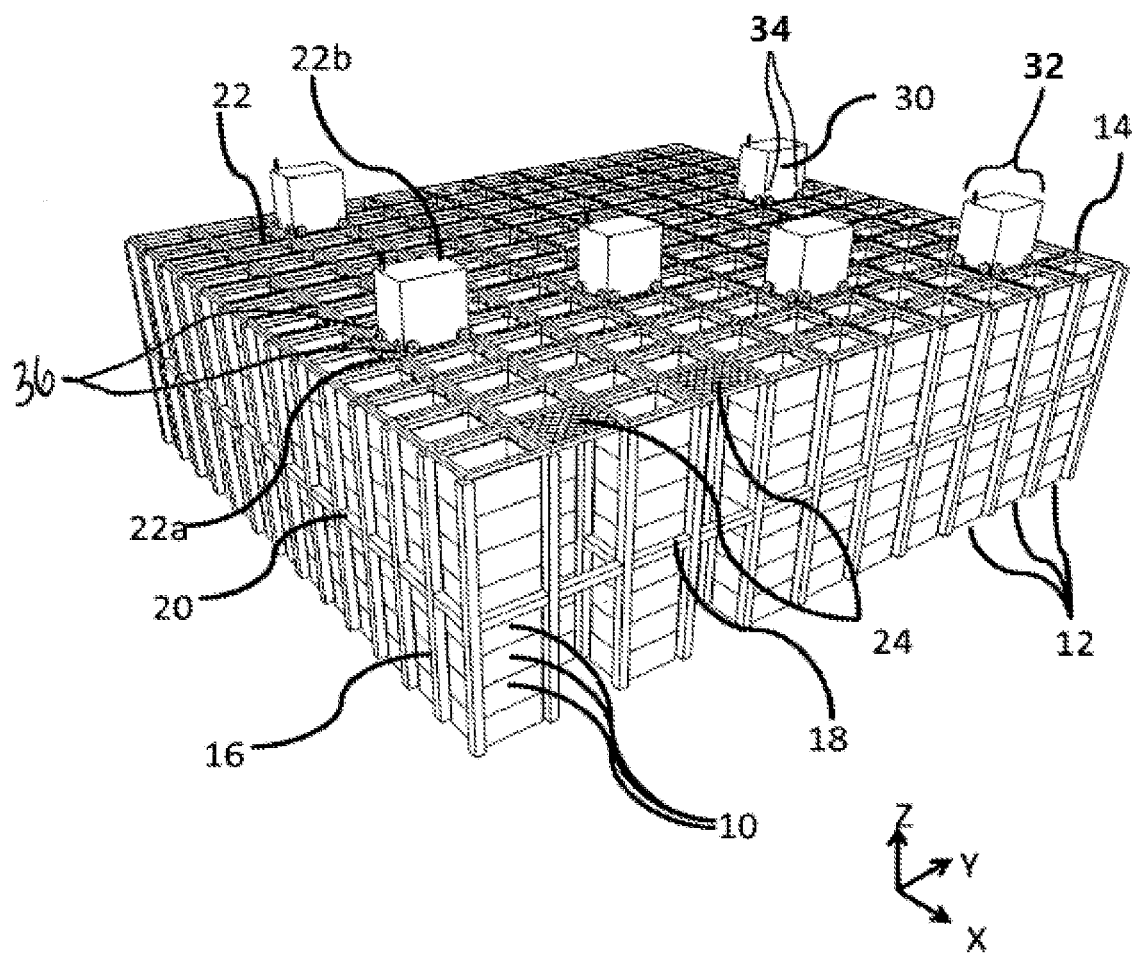
FIG. 4 is a schematic perspective view of a known storage system comprising a plurality of load handler devices of the type shown in FIGS. 3(*a*), 3(*b*) and 3(*c*), installed on the frame structure of FIGS. 1 and 2.
Figure 5:
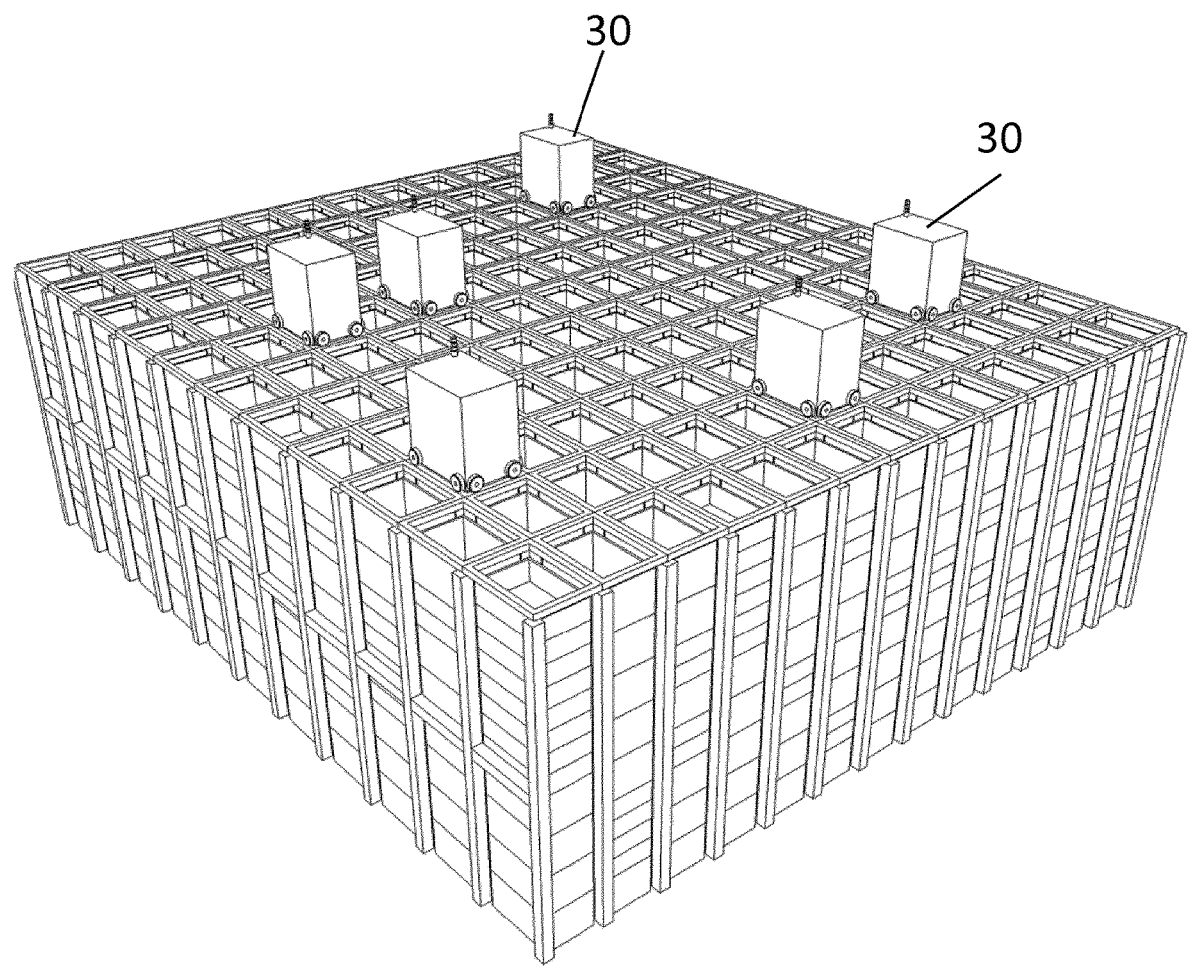
FIG. 5 is a schematic perspective view of a known storage system comprising a plurality of load handling devices of the type shown in FIGS. 3(*a*), 3(*b*), and 3(*c*) installed on the frame structure of FIGS. 1 and 2, the frame structure containing bins of varying dimensions.

The top level of the frame structure 14 includes rails 22 arranged in a grid pattern across the top of the stacks 12. Referring additionally to FIGS. 3 and 4, the rails 22 support a plurality of robotic load handling devices 30. A first set 22*a* of parallel rails 22 guide movement of the load handling devices 30 in a first direction (X) across the top of the frame structure 14, and a second set 22*b* of parallel rails 22, arranged perpendicular to the first set 22*a*, guide movement of the load handling devices 30 in a second direction (Y), perpendicular to the first direction. In this way, the rails 22 allow movement of the load handling devices 30 in two dimensions in the X-Y plane, so that a load handling device 30 can be moved into position above any of the stacks 12.

Each load handling device 30,100,102 comprises a vehicle 32 which is arranged to travel in the X and Y directions on the rails 22 of the frame structure 14, above the stacks 12. A first set of wheels 34,116 consisting of a pair of wheels 34,116 on the front of the vehicle 32 and a pair of wheels 34,116 on the back of the vehicle 32, are arranged to engage with two adjacent rails of the first set 22*a* of rails 22. Similarly, a second set of wheels 36,118 consisting of a pair of wheels 36,118 on each side of the vehicle 32, are arranged to engage with two adjacent rails of the second set 22*b* of rails 22. Each set of wheels 34, 36,116,118 can be lifted and lowered, so that either the first set of wheels 34,116 or the second set of wheels 36,118 is engaged with the respective set of rails 22*a*, 22*b* at any one time.

When the first set of wheels 34,116 is engaged with the first set of rails 22*a* and the second set of wheels 36,118 are lifted clear from the rails 22, the wheels 34,116 can be driven, by way of a drive mechanism (not shown) housed in the vehicle 32, to move the load handling device 30 in the X direction. To move the load handling device 30 in the Y direction, the first set of wheels 34,116 are lifted clear of the rails 22, and the second set of wheels 36,118 are lowered into engagement with the second set of rails 22a. The drive mechanism can then be used to drive the second set of wheels 36,118 to achieve movement in the Y direction.

In this way, one or more robotic load handling devices 30 can move around the top surface of the stacks 12 on the frame structure 14 under the control of a central picking system (not shown). Each robotic load handling device 30 is provided with means 108,110, for lifting out one or more bins or containers 106 from the stack to access the required products. In this way, multiple products can be accessed from multiple locations in the grid and stacks at any one time. The known robotic load handling devices are designed to use a container of a specified height 114 due to constraints on the size of the interior space 112,120.

It will be noted from the description above and with reference to the drawings, that the portion of the load handling device 30 carried by the wheels covers one grid spacing of the grid system above the stack.

FIG. 4 shows a typical storage system as described above, the system having a plurality of load handling devices 30 active on the stacks 12.

In a first embodiment of the invention, a taller robotic load handler is used. The tall robotic load handler device 50, will now be described with reference to FIGS. 6 to 8. All items common to the load handling device described with reference to FIGS. 1 to 5 will bear the same reference numbers.

These taller load handling devices are sized so as to carry bins similar to those shown in FIG. 6. FIG. 7 shows a tall load handling device lifting a tall bin. On lifting the bin to the top of the stack, the bin locates within the body of the load handling device. The load handling device 50 retains the same dimensions as a normal load handling device, in that the wheeled portion of the device occupies one grid spacing of the track system above the stacked bins. In this way, the stacks can contain bins of differing heights, the tall load handling device being moved to a grid spacing to remove a tall bin as and when required. Normal height devices can continue to remove normal height bins as required.

FIG. 8 shows a number of tall load handling devices operable on a grid above a stack together with a number of normal sized load handling devices. It will be noted that the stack contains bins of differing heights. However, all the bins occupy a position in the stack with a footprint of a single grid spacing.

It will be appreciated that these taller load handlers may have inferior mechanical stability, compared to the normal robotic load handlers, but this could be acceptable if acceleration and speed are adequately reduced.

For items, which are larger still another embodiment of the present invention offers a solution with a robotic load handler which straddles more than one grid space. This can for example be 2, 4, 6, 8 or 9 grid spaces, representing 2×1, 1×2, 2×2, 2×3 or 4×2, 2×4 or 3×3 grid spaces. In the following example only the case of a load handling device with a footprint of 2×2 spaces will described. However, it will be appreciated that the larger load handling device described may occupy any number of grid spacings. In order to make best use of an integrated system for both normal and larger robotic load handlers, these large load handling devices 50a would be designed to travel on the same grid structure as the normal load handlers, as shown in FIG. 9.

The large load handling device may be provided with multiple sets of wheels 34, 36.

As can be seen in FIG. 9, the larger 2×2 grid spacing footprint load handling device can be operable on a grid with other normal single grid spacing footprint load handling devices. The 2×2 load handling device 50a is provided with a first set of wheels 34, consisting of a number of pairs of wheels 34 on opposing parallel sides of the vehicle 50a. The wheels 34 are arranged to engage with three adjacent rails of the first set 22a of rails 22.

Similarly, a second set of pairs of wheels 36 is provided, this set consisting of pairs of wheels 36 on opposing sides of the vehicle, these opposing sides being substantially perpendicular to the first set of opposing sides of the vehicle. The wheels 36, are arranged to engage with two adjacent rails of the second set 22b of rails 22.

Each set of wheels 34, 36 can be lifted and lowered, so that either the first set of wheels 34 or the second set of wheels 36 is engaged with the respective set of rails 22a, 22b at any one time.

As shown in FIG. 9, the large load handling device can operate on the same grid as normal load handling devices. However, in FIG. 9, the device would lift multiple containers of single grid spacing size.

As shown in FIG. 11, in use, the large load handling device can lift containers approximately 1300×900 mm given that a normal container located in a single grid spacing is 600×400 mm and the space between stacks is 100 mm. These 2×2 grid spacing containers could then come in different heights, to accommodate different size products. For example the heights of these large containers could be 300, 500 and 1000 mm as shown in FIG. 10.

The larger 2×2 grid spacing bins shown in FIG. 10 cannot be stacked in stacks with smaller 1×1 grid spacing bins. Conversely, a normal 1×1 grid spacing load handling device cannot traverse the space above the stacks of large containers. A typical system according to this embodiment of the present invention would have the bulk of the facility dedicated to normal containers and normal robotic load handlers. There would be a small number of work stations for goods-in, picking/packing and dispatch designed for the larger container and a relatively small section of the storage space and associated grid above dedicated to large containers. This arrangement is shown in FIGS. 12 and 13.

In use, the large robotic load handling device operates on the grid above the stack as normal but only lifts large bins from the stack at a location where the stack solely contains bins of a larger footprint and multiple heights.

The load handling device lifts the larger bins from the stack in to a cavity within the body of the load handling device such that the bin is lifted clear of the grid above the stacks.

It will be appreciated that the robotic load handling devices described above are embodiments of the invention only. Load handling devices may be considered that can carry bins of any multiple of grid spacings in area with multiple height possibilities.

The picking system described above may relate to an order picking system such as those devised for online retailing or may relate to systems such as parcel handling and sorting systems. It will be appreciated that the invention applies to any system where items are stored in containers in a stacked structure and may be accessed by robotic handling devices.

The invention claimed is:

1. An object handling system comprising:
   two substantially perpendicular sets of rails forming a grid in a horizontal plane above a plurality of stacks of containers, the grid having a plurality of grid spacings wherein each grid spacing is an open area between each perpendicular set of rails, the plurality of grid spacings allowing target containers to be retrieved or deposited relative to associated stacks within the plurality of stacks through the open area, wherein a smallest grid spacing of the plurality of grid spacings has a 1×1 dimension in the horizontal plane;
   at least one portion of the grid having a first grid spacing associated with target containers having a larger cross-sectional area relative to the horizontal plane than target containers associated with the smallest grid spacing, the first grid spacing being formed of a plurality of the smallest grid spacings;
   a plurality of first robotic load handling devices for operation on an entirety of the grid above the stacks of containers, the plurality of first robotic load handling devices each including a body mounted on wheels, the body having lifting means for lifting a container from a stack of containers, the wheels including a first set of wheels arranged to engage with at least two rails of the first set of rails and a second set of wheels arranged to engage with at least two rails of the second set of rails, the first set of wheels being independently moveable and driveable with respect to the second set of wheels such that when in motion only one set of wheels will engage with the grid at any one time thereby enabling movement of the load handling devices along the rails by driving only the set of wheels engaged with the rails; and
   at least one second robotic load handling device for operation on the grid, the at least one second robotic handling device having a body with a cavity that aligns with dimensions of the first grid spacing to receive the larger cross-sectional area containers according to an orientation of the larger cross-sectional area containers in a respective stack, the at least one second robotic handling device being configured to lift and move containers from one or more stacks associated with the first grid spacing, and configured to lift and move the larger cross-sectional area containers into the cavity.

2. An object handling system according to claim 1, wherein the body of the at least one second robotic load handling device accommodates larger cross-sectional area containers of approximately 1×2, 2×2, 2×3, or 3×3 second grid spacings and said cavity spans at least multiples of the smallest grid spacing in at least one horizontal direction of the horizontal plane to accommodate the larger cross-sectional area containers.

3. An object handling system according to claim 1, configured such that each container when transported by a respective first or second robotic load handling device will be located within the cavity of the body of the respective first or second robotic load handling device, wherein the cavity is substantially centrally positioned in the body of the respective first or second robotic load handling device.

4. An object handling system according to claim 1, wherein at least one of the plurality of first robotic load handling devices or the at least one second robotic load handling device comprises:
   lifting means for lifting and transporting containers of a plurality of different heights.

5. An object handling system according to claim 1, wherein a majority of the system is configured to accommodate containers of a single predetermined size, and a minority of the system is configured to accommodate containers of a plurality of cross-sectional areas and heights, said containers to be accommodated in the minority of the system are to be stored in stacks accessed by the at least one second robotic load handling device configured to lift and transport at least the containers of the plurality of cross-sectional areas and heights.

6. An object handling system according to claim 1, wherein a majority of the system is configured to accommodate containers of a single predetermined size in a remainder of stacks, a minority of the system being configured to accommodate the portion of the stacks associated with the first grid spacing, the containers in the portion of the stacks associated with the first grid spacing having a plurality of different cross-sectional areas in the horizontal plane, said containers of the plurality of different cross-sectional areas to be stored in the portion of the stacks associated with the first grid spacing and accessed by the at least one second robotic load handling device.

7. An object handling system according to claim 1, wherein the cavity is of a size within the body of the at least one second robotic handling device such that said containers are lifted clear of the grid above the plurality of stacks through the first grid spacing.

8. An object handling system comprising:
   two substantially perpendicular sets of rails forming a grid in a horizontal plane above a plurality of stacks of containers, the grid having a plurality of grid spacings, each grid spacing defining an open area between each perpendicular set of rails for accessing an associated stack of containers, a first portion of the plurality of stacks being configured to accommodate containers of a first size and a second portion of the plurality of stacks being configured to accommodate containers of at least one second size, wherein the containers of the at least one second size have a height and width greater than the containers of the first size, wherein the containers of the first size have a width accommodated by a single grid space of the plurality of grid spacings, the single grid space having 1×1 dimensions in the horizontal plane of the grid, and the container of the second size has a width accommodated by a second grid space of the plurality of grid spacings, the second grid space being formed of multiple single grid spaces of the plurality of grid spaces; and
   a plurality of first robotic load handling devices and at least one second robotic load handling device, each of the plurality of first robotic load handling devices and the at least one second robotic load handling device being configured for operation on an entirety of the grid in the horizontal plane above the plurality of stacks of containers, each of the plurality of first robotic handling devices and the at least one second robotic load handling device having a body mounted on wheels, a first set of wheels being arranged to engage with at least two first rails of the perpendicular sets of rails, a second set of wheels being arranged to engage with at least two second rails of the perpendicular sets of rails, the first set of wheels being configured to be independently moveable and driveable with respect to the second set of wheels such that when in motion only one set of wheels will engage with the grid at any one time thereby enabling movement of the plurality of first robotic load handling devices or the at least one second robotic load handling device along the rails to a specified point on the grid by driving only the set of wheels engaged with the rails, wherein the at least one second robotic handling device has a body having a cavity that aligns with dimensions of the second grid space to receive the containers of the greater height and width according to an orientation of the containers of the second size in a respective stack, the at least one second robotic handling device being configured to lift and move target containers of a plurality of different heights and a plurality of widths within the cavity, wherein the plurality of widths of the target containers are greater in at least one horizontal direction of the horizontal plane than at least one dimension of the single grid.

9. An object handling system according to claim 8, wherein the cavity is of a size within the body of the at least one second robotic handling device such that said containers are lifted clear of the grid above the plurality of stacks through the second grid space.

10. An object handling system according to claim 8 in which the at least one second robotic load handling device has a greater number of wheels than the plurality of first robotic load handling devices.

11. An object handling system according to claim 10 in which the first set of wheels of the at least one second robotic load handling device has at least three pairs of wheels and the second set of wheels of the at least one second robotic load handling device has at least three pairs of wheels.

12. An object handling system according to claim 11 in which the first set of wheels of the plurality of first robotic load handling devices has at least two pairs of wheels and the second set of wheels of the plurality of first robotic load handling devices has at least two pairs of wheels.

13. An object handling system according to claim 8 in which the first set of wheels of the at least one second robotic load handling device has at least three pairs of wheels and the at least one second set of wheels of the second robotic load handling device has at least three pairs of wheels.

14. An object handling system according to claim 8 in which the first set of wheels of the plurality of first robotic load handling devices has at least two pairs of wheels and the second set of wheels of the plurality of first robotic load handling devices has at least two pairs of wheels.

* * * * *